UNITED STATES PATENT OFFICE.

FREDERICK M. BECKET, OF NIAGARA FALLS, NEW YORK, ASSIGNOR TO ELECTRO METALLURGICAL COMPANY, OF NIAGARA FALLS, NEW YORK, A CORPORATION OF WEST VIRGINIA.

METHOD OF TREATING TUNGSTEN ORES.

1,081,571.  Specification of Letters Patent.  Patented Dec. 16, 1913.

No Drawing.   Application filed September 25, 1913.   Serial No. 791,733.

*To all whom it may concern:*

Be it known that I, FREDERICK M. BECKET, a subject of the King of Great Britain, residing at Niagara Falls, in the county of Niagara and State of New York, have invented certain new and useful Improvements in Methods of Treating Tungsten Ores, of which the following is a specification.

In my copending application Serial No. 770,031, filed May 26, 1913, I have described and claimed a process of preparing low-phosphorus tungsten or ferrotungsten from certain phosphorus-bearing tungsten ores, which may or may not contain manganese, according to which the ores are first subjected to a reducing operation at a temperature below the melting-point of the reduced product, and thereafter treated by an acid solvent or otherwise to remove phosphorus.

I have found that a procedure similar to the above may be very advantageously applied to certain ores of tungsten which contain considerable proportions of manganese, associated with iron, but which are either free from phosphorus, or contain phosphorus in proportions which are negligible from a technical standpoint. Such ores are herein referred to as "low-phosphorus ores." As applied to such ores, the treatment serves to increase the ratio of tungsten to manganese, and thereby to render the ore available for the preparation of metallurgical products containing comparatively little manganese.

The present method is applicable for instance to wolframite, an iron-tungstate containing considerable manganese, and to hübnerite, an iron-manganese tungstate in which manganese predominates, such ores being herein referred to as ores of the "iron-tungstate type."

The present method may be carried into effect as follows: The low-phosphorus tungsten ore or concentrate is first subjected to a reducing operation, appropriate reducing agents being for example carbon, hydrogen, carbon monoxid, producer-gas, or furnace gases having a reducing character. The reduction is effected under known conditions at a temperature below the melting-point of the reduced product, and the reduction may be either partial, approximately complete, or complete, according to the circumstances. The product of this reducing operation, hereinafter referred to as the "reduced product," is next subjected to an appropriate treatment for the removal of part or all of the manganese. This may be accomplished by treatment with an acid or acid-reacting body under the following conditions: To the reduced product is added an excess of sulfuric acid, for instance of 1.20 specific gravity, and the mass is allowed to stand for 24 hours with frequent stirring. Moderate heating accelerates the reaction, but involves some loss of tungsten by solution. The conditions are in all cases so controlled as to increase the ratio of tungsten to manganese. The solution is then drained off, and is preferably applied to the purification of successive batches of reduced product, with such reinforcement as may be required. By this treatment, 70 per cent. or upward of the manganese may be removed, and also a large percentage of the iron, the result of the removal of the iron being of course a corresponding concentration of the tungsten-content of the reduced product. Instead of the above-described acid-treatment, any other appropriate procedure for removing manganese may be used. In case the initial reduction of the mass was complete or substantially complete, the purified product is now melted in an electric furnace, yielding directly a commercially available metal or ferroalloy, the composition of which depends upon the amount of residual iron. In case the initial reduction was partial or incomplete, the reduced product is subjected to a further or supplementary reducing action, preferably in the electric furnace, in accordance with methods now well known to those skilled in this art, and preferably by means of a non-carbonaceous reducing agent, such as silicon, whereby there is obtained a metal or ferroalloy which is low in manganese, and likewise low in carbon.

I claim:—

1. The method of treating tungsten ores, which consists in subjecting a low-phosphorus, manganese-bearing ore of the iron-tungstate type to a reducing operation, and treating the reduced product to increase the ratio of tungsten to manganese.

2. The method of treating tungsten ores, which consists in subjecting a low-phosphorus, manganese-bearing ore of the iron-tungstate type to a reducing operation, treating the reduced product to increase the ratio of tungsten to manganese, and thereafter completing the reduction.

In testimony whereof I affix my signature in presence of two witnesses.

FREDERICK M. BECKET.

Witnesses:
J. H. NELLES,
SIDNEY OTIS.